United States Patent [19]

Frank

[11] 3,920,138

[45] Nov. 18, 1975

[54] METHOD OF MOUNTING IMPLEMENT DEVICE ON TRACTOR

[76] Inventor: Eldon M. Frank, Rte. 1, Lake View, Iowa 51450

[22] Filed: July 16, 1973

[21] Appl. No.: 379,753

Related U.S. Application Data

[62] Division of Ser. No. 260,465, June 7, 1972, Pat. No. 3,863,786.

[52] U.S. Cl. .............................................. 214/152
[51] Int. Cl.² .......................................... E02F 3/70
[58] Field of Search ....... 214/131 A, 140, 145, 620, 214/152

[56] References Cited
UNITED STATES PATENTS

| | | | |
|---|---|---|---|
| 2,738,083 | 3/1956 | Cadwell | 214/131 A |
| 3,324,954 | 6/1967 | Westendorf | 214/131 A |
| 3,460,690 | 8/1969 | Seifert | 214/152 |
| 3,612,311 | 10/1971 | Eidy | 214/131 A |

Primary Examiner—Albert J. Makay
Assistant Examiner—Ross Weaver
Attorney, Agent, or Firm—Zarley, McKee, Thomte & Voorhees

[57] ABSTRACT

The method of mounting a loader involving driving the tractor into the loader until the forward pivot arms engage the forwardly extending side frame members and then the hydraulic system is operated to allow the boom and frame to move towards each other whereby the center of gravity of the loader is rearwardly of the pivotal support causing the loader to pivot by its own weight onto the tractor with the rear supports positioning themselves. The support stand is then pivoted upwardly to provide a guard for the forward end of the tractor. When the loader is removed the support stand is pivoted downwardly for engagement with the ground and the hydraulic cylinders are extended thereby shifting the center of gravity forwardly of the pivotal support arms and causing the loader to pivot upwardly.

3 Claims, 6 Drawing Figures

U.S. Patent   Nov. 18, 1975   3,920,138
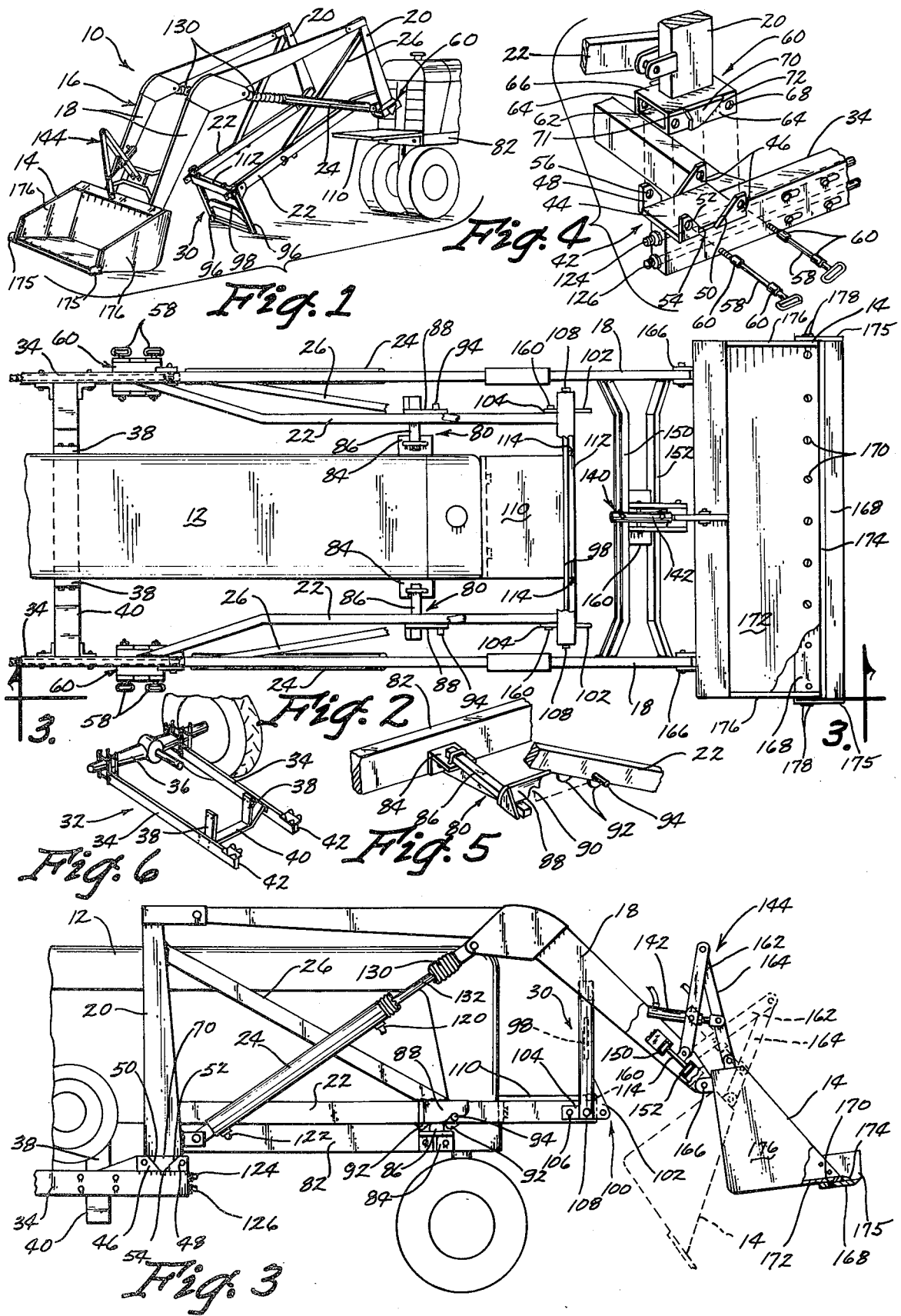

METHOD OF MOUNTING IMPLEMENT DEVICE ON TRACTOR

This is a division, of application Ser. No. 260,465 filed June 7, 1972 now U.S. Pat. No. 3,863,786.

A front end loader for a tractor should be easily put on and taken off and should require no special tools or equipment. It should also provide protection against damaging the tractor. Further, the tractor should be stable with the loader on and with the loader off should be useable for other jobs without loader brackets interferring. Maximum flexibility in the pivoting of the bucket on the loader is desirable and thus it is an advantage to have a bucket which will pivot through a wide angle. A provision should also be made for the problem of substantial wear on the forward edge of the bottom scoop wall which is subjected to considerable wear and tear. The loader should be as short as possible to maintain balance on the tractor. The loader arrangement shoud allow for use of single-acting hydraulic cylinders which are less expensive. Protection for the front end of the tractor is also important.

These and other problems are simply resolved by the loader and method of attachment contemplated by this invention. A support stand is pivotably provided on the front end of the loader frame and when not used is pivoted upwardly for use as a guard for the front end of the tractor. The tractor is provided with a subframe assembly secured at the rear to the lower sides of the axle and extends forwardly under the pulley wheel where it is again secured to the sides of the tractor and under the tractor to provide vertical and horizontal stability. A pair of support pads are provided on the forward ends of the subframe assembly for supporting the rear end of the loader. A self-centering connection is provided and side pivotal supports are provided on the forward end of the tractor for self-locking engagement with cooperating means on the forwardly extending side frame members of the loader.

With the loader off the tractor supported by the support stand and the scoop on the forward end the frame extends upwardly at the rear such that the tractor may drive directly into the frame until the forward pivot support bracket engages the cooperating means on the loader side frame members. The cylinders on the loader are then retracted and the weight of the loader shifts such that the center of gravity is rearwardly of the pivotal support arms thereby causing the loader to pivot into operative position and bolts are then placed in the rear connection and the support stand is pivoted to an upstanding position. The tractor does not need to be driven forwardly after the loader power cylinders are operated and the weight of the loader itself causes the loader to pivot on and off the tractor.

When the loader is removed the cylinders are extended after the bolts in the rear mounting brackets have been removed and the weight then will shift the center of gravity forwardly of the pivotal support arms causing the loader to tip forwardly until the scoop engages the ground at which time the tractor may be backed away.

When the scoop is digging into the ground a tendency is present for the loader to move upwardly on the tractor and thus a forwardly extending stop member may be provided on the tractor for engaging the forward end of the loader frame. Oppositely disposed side stop elements may be provided for engaging the tractor stop plate to provide lateral stability.

Further lateral stability is provided by the fact that diagonal frame members between the vertical and horizontal frame members engage the diagonally extending hydraulic cylinders when the loader is raised and lateral instability is at its greatest. The scoop is mounted as close to the front end of the tractor as possible in part due to the fact that cross members are provided on the forward end of the boom which have rearwardly extending end portions connected to the boom side portions thus placing the center of the cross portions more forwardly. An A-frame is provided on the cross assembly on the boom with one of the legs pivoted to the cross member and the other leg pivoted to the scoop. The scoop is also pivoted to the boom and a double-acting hydraulic cylinder is provided between the legs of the A-frame such that a small movement of the power cylinder will cause a substantial pivoting of the scoop. The forward edge of the bottom wall of the scoop is protected by a replaceable blade being provided on the lower side and held in place by a series of bolts. An upstanding shoulder on the blade engages the forward edge of the scoop bottom wall to transmit the horizontal forces directly into the bottom wall to relieve the strain on the bolts.

This invention consists in the construction, arrangements and combination of the various parts of the device, whereby the objects contemplated are attained as hereinafer more fully set forth, specifically pointed out in the claims, and illustrated in the accompanying drawings in which:

FIG. 1 is a fragmentary side perspective view of the loader being supported by its scoop and support stand with the tractor being remotely positioned.

FIG. 2 is a fragmentary top plan view of the loader mounted on the tractor.

FIG. 3 is a cross sectional view taken along line 3 — 3 in FIG. 2.

FIG. 4 is a fragmentary exploded view of the rear support connection between the subframe assembly and the loader frame.

FIG. 5 is an exploded view of the forward pivotal support arm connecting elements just prior to engagement.

FIG. 6 is a reduced in scale fragmentary perspective view of the subframe assembly secured to the tractor's rear axle.

The loader of this invention is referred to in FIG. 1 generally by the reference numeral 10 and in FIG. 2 is mounted on a tractor 12. The loader includes a bucket-working tool 14 pivotally mounted on the forward end of a boom 16 having oppositely disposed side frame members 18. The side frame members are pivotally connected to the upper ends of upstanding frame members 20 which in turn are connected to forwardly extending side frame members 22. Single or double acting power cylinder 24 extend from the base of the upright members 20 to the boom side frame members 18 for raising and lowering the boom relative to the frame. A diagonally extending brace 26 extends from the upper end of the upright members 20 forwardly for engagement with the forwardly extending side frame members 22. As seen in FIG. 1, a support stand 30 is provided for supporting the loader in conjunction with the scoop 14.

The loader 10 is designed to fit on small and large tractors due to the fact that a subframe assembly 32 is provided as seen in FIG. 6 which will be individualized for a given tractor. The subframe assembly 32 includes forwardly extending side frame members 34 connected at their rear ends to the lower side of the tractor's rear axle 36. The subframe is given horizontal and vertical stability at its forward end by including upstanding members 38 on a cross member 40 interconnecting the side members 34. It is understood that the cross member 40 could be formed from two horizontally disposed portions connected directly to the side or bottom of the tractor. The forward ends of the side frame members 34 include support pads 42 seen in detail in FIG. 4. The support pads 42 include a horizontally disposed plate 44 having unstanding rear side guide portions 46 and forwardly spaced front side guide portions 48. The rear guide portions 46 include downwardly and forwardly tapering forward edges 50 while the forward portions 48 include downwardly and rearwardly tapering edges 52 which merge into vertical edges 54. Each of the side portions include holes 56 to receive bolts 58 having shoulders 60 positioned for engagement with the openings for ease of removal.

The lower end of the upright frame members 20 telescope into the support pads 42 and include a hollow member 60 having a bottom wall 62 with oppositely disposed side walls 64 and a top wall 66. The side walls include openings 68 which align with the openings 56 in the guide portions 46 and 48. Wedge-shape portions 70 provided on the outside side walls 64 and have forward and rearward edges 71 and 72, respectively, for mating engagement with the guide wall 54 and 50, respectively. Thus, it is seen that as the rear end of the loader is pivoted downwardly it will center itself within the support pad 42 with the side edges 64 being matingly engaged by the guide walls 46 and 48 and the edges of the guide engaging the corresponding complementarily shaped edges of the guide element 70.

As seen in FIG. 5, a pivot support arm assembly 80 is provided on the tractor side frame 82 and includes an L-shaped bracket 84 bolted to the frame member 82 with a laterally outwardly extending arm 86 being secured thereto. A keeper element 88 is provided on the outer end having a notch 90 on the forward bottom side. The side frame members 22 of the loader include a pair of downwardly facing spaced apart shoulders 92 adapted to be positioned on opposite sides of the pivot arm 86 while a laterally outwardly extending pin 94 is adapted to be received in the downwardly facing notch 90 in the keeper element 88. It is seen that in FIG. 1 the tractor is approaching the loader and the angular relationship of loader relative to the tractor is shown in FIG. 5 in enlarged scale. Thus the tractor moves toward the loader and the angle of the loader causes the rearmost downwardly extending shoulder 92 to be above the pivot arm such that the pivot arm can move horizontally into engagement with the forwardmost shoulder 92. At this time the notch 90 is in engagement with the pin 94. As the loader is then pivoted onto the tractor the loader side frame 22 moves to a horizontal position, as seen in FIG. 3, and the downwardly facing shoulders 92 are now in the same plane common with the pivot arm support 86 while the pin 94 is locked in the notch 90 in the keeper element 88 thereby automatically locking the forward end of the loader to the tractor and preventing movement in all directions. As will be seen later, when the loader is pivoted off the tractor, this forward pivot support arm connection is automatically disengaged.

The support stand 30 is seen in its downwardly extending position in FIG. 1 and in its upwardly extending tractor guard position in FIG. 3 and includes oppositely disposed posts 96 interconnected by one or more cross members 98, the lowermost of which prevents the stand from sinking into soft ground. In the guard position of FIG. 3, the cross members protect the forward end of the tractor. A plate element 100 having forwardly and rearwardly extending apertured portions 102 and 104 are adapted to be aligned with the opening 106 on the side frame 22 to lock the support stand in downwardly and upwardly extending positions respectively as the post pivots about its pivotal axis 108.

Should further stability be required a forwardly extending plate 110 may be bolted onto the front end of the tractor and extend over the cross frame member 112 interconnecting the loader side frame members 22 thereby assisting in limiting vertical movement of the loader relative to the tractor such as when the scoop 14 is digging into the ground. Laterally spaced apart upstanding stop elements 114 may be provided on opposite sides of the plate 110 on the cross member 112 to engage the opposite side edges of the plate 110 to limit relative lateral movement therebetween.

All loaders tend to be somewhat more unstable when the boom is in a raised position and thus this loader includes the positioning of the diagonal brace 26 relative to the lift cylinders 24 such that they will engage each other to limit lateral movement therebetween, as seen in FIG. 2. In a lowered position of the boom the hydraulic cylinders 24 will be spaced substantially further from the brace elements 26 since the brace elements not only extend forwardly and downwardly from the upright members 20 but also laterally inwardly into engagement with the side frame members 22.

The hydraulic cylinders 26 may be either single acting or double acting and are shown as being double acting with hydraulic lines 120 and 122 connected onto lines 124 and 126 built into the side frame members 22 of the loader. Thus it is seen that very short lengths of hoseline 120 and 122 are required to be exposed to the outside. Loaders of the nature of this invention are commonly involved in conditions that can be injurious to the hydraulic cylinders by moisture, dirt and the like collecting on the piston rods and thus bellow sleeves 130 are provided on the piston rods 132 and extend and contract as the hydraulic cylinders are operated.

The stability of the loader and the tractor can be improved by maintaining the length of the loader as short as possible. This has been made possible by the design of the cross support structure 140 for the hydraulic cylinder 142 which pivots the bucket 14 by operation of an A-frame linkage 144. The cross frame structure includes a pair of oppositely facing members 150 and 152 wherein the outer ends extend in opposite directions into engagement with the boom side frame members 18 thus positioning the member 150 closer to the forward end of the tractor and thereby allowing the scoop 14 to be located closer. Additional strength is provided in the boom by the angled ends of the members 150 and 152 which are further interconnected by a plate 160. A single power cylinder 144 is required and is connected between the A-frame legs 162 and 164 intermediate their ends as seen in FIG. 3. The leg 162 is connected at its lower end to the plate 160 while the other leg 164 is pivotally connected to the scoop 14 remotely of its pivot connection 166 to the side frame members 18. Thus an unusually large angle of pivotal action is obtained by a very short stroke of the power cylinder 142 which is double acting. Additionally, space requirements are minimized thus also allowing the scoop to be located closer to the forward end of the tractor. It is also noted that only one power cylinder 142 is required where normally two are positioned, one on each of the side frame members 18 of the boom.

The wear on the forward edge of the scoop is handled by a detachable blade 168 being secured by a plurality of bolts 170 to the bottom wall 172 of the scoop. An unstanding shoulder 174 extends the full length of the blade 168 for engagement with the forward edge of the bottom wall 172. Thus forces on the forward edge of the blade are transmitted through the shoulder 174 to the bottom wall 172 sparing the bolts 170. Upstanding end plates 175 on the blade are connected to the bucket end walls 176 by bolts 178 and thus protect the forward edge of the bucket end walls from wear as well as strength the connection of the blade 168 to the bucket 14.

Thus it is seen in operation that the tractor is driven into the loader until the pivot arm 86 is between the shoulders 92 and the pin 94 is in the notch 90. The tractor is then not moved again until the loader is completely on the tractor and is ready to be used. The hydraulic cylinders may be hooked up by connecting the lines 120 and 122. It is noted that when the loader is in the position of FIG. 1 being supported by the stand 30 and the scoop 14, the center of gravity is forwardly of a pivotal axis transversely between the shoulders 92 coincident with where the pivot arm 86 is when the loader is on the tractor. Thus, the next step of allowing the hydraulic lines through the cylinders 26 to be opened allows the boom 16 to move towards the side frame members 22 thereby shifting the center of gravity rearwardly of the pivot arm 86 and thus causing the loader to literally pivot or fall onto the tractor. The loader is limited against movement relative to the tractor by the shoulders 92 straddling the pivot arms 86 and thus the rear end of the loader moves downwardly with the members 60 telescoping into and onto the support pads 42 on the subframe 32. The connection at these points is self-centering and thus then only requires the final step of inserting the bolts 58 into the aligned openings 56 and 68. The loader at its front end is automatically locked in place by the downwardly facing shoulders 92 straddling the pivot arm 86 and the pin 94 being locked under the keeper element 88 by being in the notch 90. The support stand 30 is pivoted to its upstanding position of FIG. 3 and functions as a guard for the forward end of the tractor. When the forward end of the loader pivots upwardly it moves directly into engagement with the forwardly extending plate 110 carried on the tractor to assist the pivot arm assembly 80 in maintaining stability at the forward end. When the loader is to be removed it is only necessary to first pivot the support stand 30 to its downwardly extending position of FIG. 1 and then extend the single or double acting cylinders 26 to shift the center of gravity of the loader forwardly of the pivot arm 86 after the bolts 58 have been removed from the rear support pad 42. This will cause the loader to pivot about the pivot arm 86 disconnecting the rear connection at the support pad 42 and opening up the pivot arm connection such that the rearward shoulder 92 is now above the pivot arm 86 and the pin 94 is below the keeper 88 for ease of separation as seen in FIG. 5.

It is further noted that maximum safety is provided for the tractor against damage to the frame by the use of the subframe 32 as seen in FIG. 6 which transfers the load of the loader to the rear axles and the midsection of the tractor. It is further seen that any tractor can be fitted with the same loader by varying the subframe 32 to fit a given tractor. It is further seen that the tractor can be readily used for other jobs since the subframe is under the tractor and does not interfere with other functions.

I claim:

1. The method of mounting an implement on a tractor, said implement being initially detached from the tractor and including a frame having vertical side frame members for being positioned on opposite sides of said tractor, a boom pivotally connected to the upper ends of said side frame members and extending forwardly thereof, a power means for selectively pivoting said boom relative to said upstandind side frame members, a working tool on the outer end of said boom supportingly engaging the ground, horizontally disposed forwardly extending side frame members connected at their rear ends to the lower ends of said upstanding side frame members, and said tractor including a load-bearing support pad on opposite sides of said tractor for engaging the lower end of said upstanding side frame members, forward pivot support brackets on opposite sides of said tractor for engaging cooperating means on said horizontally disposed side frame members, forwardly of said load-bearing support pads, said implement adapted to pivot about a pivotal axis through said pivotal supports between a horizontal position when mounted on the tractor and an angular position when supported on the ground, a stand rigidly connected to said horizontal side frame members and supportingly engaging the ground with said implement in said angular position with the rear ends of said horizontal side frame members extending upwardly, and said working tool engaging the ground to fully support said implement and limit it against forward movement relative to said tractor, said forward pivot brackets and said cooperating means including laterally outwardly oppositely extending stationary pivot support arms on said tractor and longitudinally spaced apart downwardly facing stop elements on said horizontal side frame members positioned to receive said pivot arms therebetween comprising the following steps, driving the tractor into said implement in said angular position between said vertical and horizontal frame members until the horizontal side frame members between said downwardly facing stop elements engage the pivot support arms on said tractor, operating the power means to pivot the boom and horizontal side frame members towards each other causing said implement and stand to pivot about a pivotal axis through said pivotal supports to said horizontal mounted position without relative forward or rearward movement between said tractor and implement and said rearmost stop elements move to positions on the rear sides of said pivot arms and in the plane of said pivot arms to limit forward movement of said implement relative to said tractor as said stand is raised off the ground and to align said implement on said tractor for said uprights to engage said support pads, and locking said upstanding side frame members to said load-bearing support pads on opposite sides of said tractor.

2. The method of claim 1 wherein said stand is pivoted to an upstanding position after said implement frame is pivoted to said horizontal mounted position.

3. The method of claim 1 wherein a keeper on each of the pivot arms extends over a laterally outwardly extending pin on the forwardly extending frame member until the implement is pivoted onto the tractor and then the pin is pivoted upwardly into substantial engagement with the keeper to limit relative vertical movement between the tractor and the implement.

* * * * *